R. WILSON.
Wheel Plow.
No. 46,412.
Patented Feb. 14, 1865.
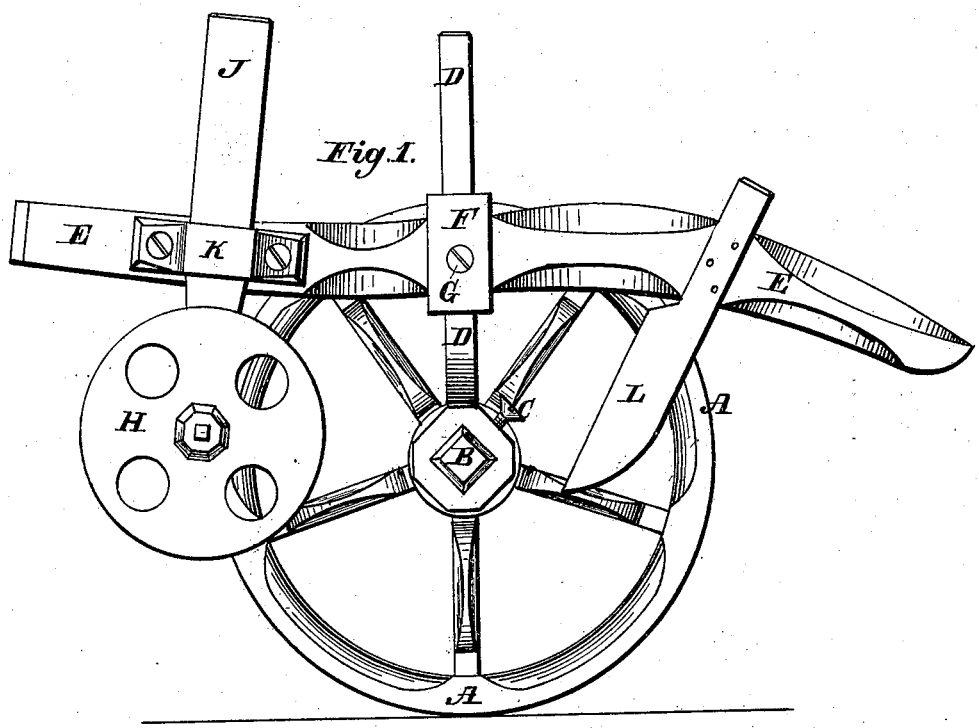
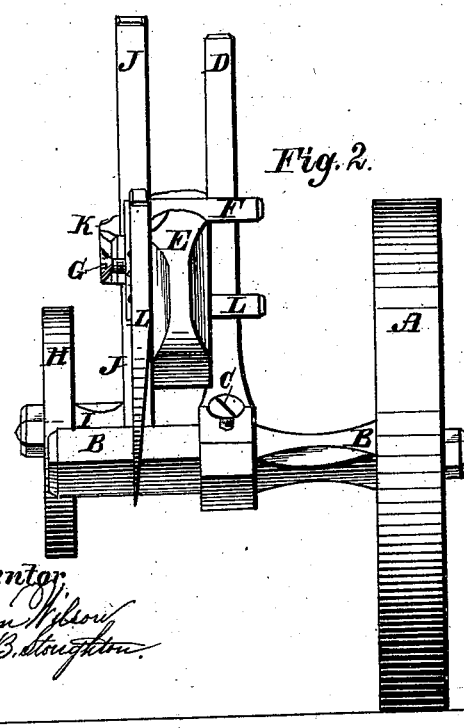

UNITED STATES PATENT OFFICE.

RICHARDSON WILSON, OF FOWLER, NEW YORK.

IMPROVEMENT IN WHEELED PLOWS.

Specification forming part of Letters Patent No. 46,412, dated February 14, 1865.

*To all whom it may concern:*

Be it known that I, RICHARDSON WILSON, of the town of Fowler, in the county of St. Lawrence and State of New York, have invented certain new and useful improvements in plows that are supported and carried upon wheels, or, as they are termed, "Wheeled Plows;" and I do hereby declare that the following is a full, clear, and exact description of the same, reference being had to the accompanying drawings, making a part of this specification, in which—

Figure 1 represents a side view of a plow-beam supported upon wheels, upon which it may be raised or lowered at pleasure to plow a shallow or deeper furrow as may be required.

Fig. 2 represents an elevation of the same, taken from the rear thereof.

Similar letters of reference, where they occur in the separate figures, denote like parts in both of the drawings.

My invention consists in the manner in which I have arranged and combined the axial supports of the larger and smaller supporting-wheels with the plow-beam, so that the latter may be adjusted to the depth of furrow required and the smaller wheel be independently adjustable on the beam, as will be explained in connection with the accompanying drawings.

A is the main supporting or carrying wheel of the plow. It is arranged upon a divided or short axle, B, and at one end thereof. At about the center (in length) of the axle B there is secured by means of a set-screw, C, so that it may be moved toward or from the wheel A, an upright support, D, to which the plow-beam is adjustably secured and held by means of the frame or yoke F and set-screw G.

The small supporting-wheel H is hung upon a journaled arm, I, which extends horizontally from the lower end of a vertical supporting-piece, J, that passes up through a loop, K, fastened to the plow-beam, and in which loop the upright piece J, as also the wheel H, which it carries, may be raised or lowered and held by a set-screw, pin, or otherwise, so as to adjust the wheel H to run upon the land while the wheel A runs in the furrow.

L represents a colter, behind which the plow may be secured to the beam in any of the ordinary well-known ways.

It will be perceived that while there is a supporting-wheel on each side of the beam, they have no common connection with each other, except through the plow-beam itself, and that the plow and beam can be adjusted to or from the landside, or higher or lower upon the axle of the main wheel, and the small supporting-wheel separately adjustable to the height of the plow, as may be required.

Having thus fully described the nature of my invention, what I claim therein as new, and desire to secure by Letters Patent, is—

The arrangement of the vertical adjustable supports D J with regard to the beam E and the axles of the supporting-wheels A H, as and for the purpose herein described and represented.

RICHARDSON WILSON.

Witnesses:
 THOMAS J. HAZELTON,
 WM. THOMPSON,
 M. E. STREETER.